United States Patent
Araújo et al.

(10) Patent No.: US 10,623,515 B2
(45) Date of Patent: Apr. 14, 2020

(54) STENOGRAPHIC MARKING USING NETWORK ADDRESSING

(71) Applicant: Fastly, Inc., San Francisco, CA (US)

(72) Inventors: João Diogo Taveira Araújo, Oporto (PT); Artur Bergman, San Francisco, CA (US); Sean A. Leach, Castle Pines, CO (US)

(73) Assignee: Fastly, Inc., San Francisco, CA (US)

( * ) Notice: Subject to any disclaimer, the term of this patent is extended or adjusted under 35 U.S.C. 154(b) by 79 days.

(21) Appl. No.: 15/366,544

(22) Filed: Dec. 1, 2016

(65) Prior Publication Data

US 2017/0155732 A1   Jun. 1, 2017

Related U.S. Application Data

(60) Provisional application No. 62/261,447, filed on Dec. 1, 2015.

(51) Int. Cl.
  *H04L 29/08* (2006.01)
  *H04L 29/12* (2006.01)

(52) U.S. Cl.
  CPC ...... *H04L 67/2842* (2013.01); *H04L 61/1511* (2013.01); *H04L 61/6004* (2013.01); *H04L 61/6059* (2013.01)

(58) Field of Classification Search
  CPC .................................................. H04L 67/2842
  See application file for complete search history.

(56) References Cited

U.S. PATENT DOCUMENTS

| | | | | | |
|---|---|---|---|---|---|
| 2008/0281696 | A1* | 11/2008 | Whitehead | ............. | G06Q 30/02 705/14.41 |
| 2010/0189264 | A1* | 7/2010 | Haddad | ............. | H04L 29/12301 380/283 |
| 2013/0329750 | A1* | 12/2013 | Asati | ..................... | H04L 45/741 370/464 |
| 2014/0250241 | A1* | 9/2014 | Barber | .............. | H04L 29/12066 709/245 |
| 2014/0379840 | A1* | 12/2014 | Dao | .................... | H04L 67/2847 709/213 |

OTHER PUBLICATIONS

Cisco, "IPv6 Addressing White Paper", Aug. 2013.*
"Start a YouTube Video at any Specific Time" (Agarwal, Amit, https://www.labnol.org/internet/set-youtube-video-start-time/18282/, Jul. 21, 2012) (Year: 2012).*

* cited by examiner

*Primary Examiner* — Nicholas P Celani

(57) ABSTRACT

Systems, methods, apparatuses, and software for a content delivery network that caches content for delivery to end user devices is presented. In one example, a method includes establishing address translations which translate domain names into network addresses usable by the end user devices for reaching content at the cache nodes, with portions of the network addresses comprising stenographic information, and responsive to domain name translation requests from the end user devices, providing ones of the network addresses. The method includes receiving content requests transferred by the end user devices that comprise the network addresses, and performing one or more actions based on the stenographic information in the network addresses.

20 Claims, 10 Drawing Sheets

STENOGRAPHIC MARKING USING NETWORK ADDRESSING

RELATED APPLICATIONS

This application hereby claims the benefit of and priority to U.S. Provisional Patent Application 62/261,447, titled "STENOGRAPHIC MARKING USING NETWORK ADDRESSING," filed Dec. 1, 2015, and which is hereby incorporated by reference in its entirety.

TECHNICAL FIELD

Aspects of the disclosure are related to the field of communication networks, and in particular content delivery and routing of content over communication networks.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery networks have been developed which add a layer of caching between origin servers and end users. The content delivery networks typically have one or more cache nodes distributed across a large geographic region to provide lower latency access to the content for the end users. When end users request content, such as a web page, which is handled through a cache node, the cache node is configured to respond to the end user requests instead of the origin servers. Content delivery networks can also support Internet Protocol version 6 (IPv6), which has been established to overcome some of the shortcomings with IPv4, namely total address space limitations as well as other protocol limitations. IPv6 incorporates a 128-bit address instead of the 32-bit address of IPv4, and IPv6 has now been implemented in most network routing equipment.

In some instances, end user devices may be configured to "attack" content delivery equipment by repeatedly and frequently requesting content from a content provider, or cause the equipment to process many content-related tasks at once, among other operations. For example, during a network bot attack, a denial of service (DoS) attack, or a distributed denial of service (DDoS) attack, one or more end user devices can request network content at a frequent pace so as to overload or crash network equipment. In cases where an origin server alone serves the network content, the origin server can quickly become overloaded by the frequent content requests and crash. Cache nodes can alleviate the burden on origin servers to defend against these attacks, however, cache nodes can have difficulty in blocking traffic related to attacks.

OVERVIEW

Systems, methods, apparatuses, and software for a content delivery network (CDN) that caches content for delivery to end user devices is presented. In one example, a method includes establishing address translations which translate domain names into network addresses usable by the end user devices for reaching content at the cache nodes, with portions of the network addresses comprising stenographic information, and responsive to domain name translation requests from the end user devices, providing ones of the network addresses. The method includes receiving content requests transferred by the end user devices that comprise the network addresses, and performing one or more actions based on the stenographic information in the network addresses.

In another example, a CDN having a plurality of cache nodes that cache content for delivery to end user devices is presented. The CDN includes a stenography node configured to establish address translations for the end user devices which translate domain names into network addresses used for reaching content at selected cache nodes, with portions of the network addresses comprising stenographic information. The stenography node is configured to provide the address translations to at least one domain name system (DNS) node that provides ones of the network addresses responsive to domain name translation requests from the end user devices. At least one of the cache nodes is configured to receive content requests transferred by the end user devices that comprise the network addresses, and perform one or more actions based on the stenographic information in the network addresses.

In another example, a method of operating a stenography node of a content delivery network that caches content for delivery to end user devices is provided. The method includes establishing address translations for the end user devices which translate domain names into network addresses used for reaching content at selected cache nodes, with portions of the network addresses comprising stenographic information used to distinguish among a plurality of DNS nodes which provide ones of the network addresses responsive to domain name translation requests from the end user devices. The method includes instructing one or more cache nodes to perform one or more actions based on the stenographic information in the network addresses responsive to receiving content requests transferred by the end user devices that comprise the network addresses.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

DETAILED DESCRIPTION

Figure 1:
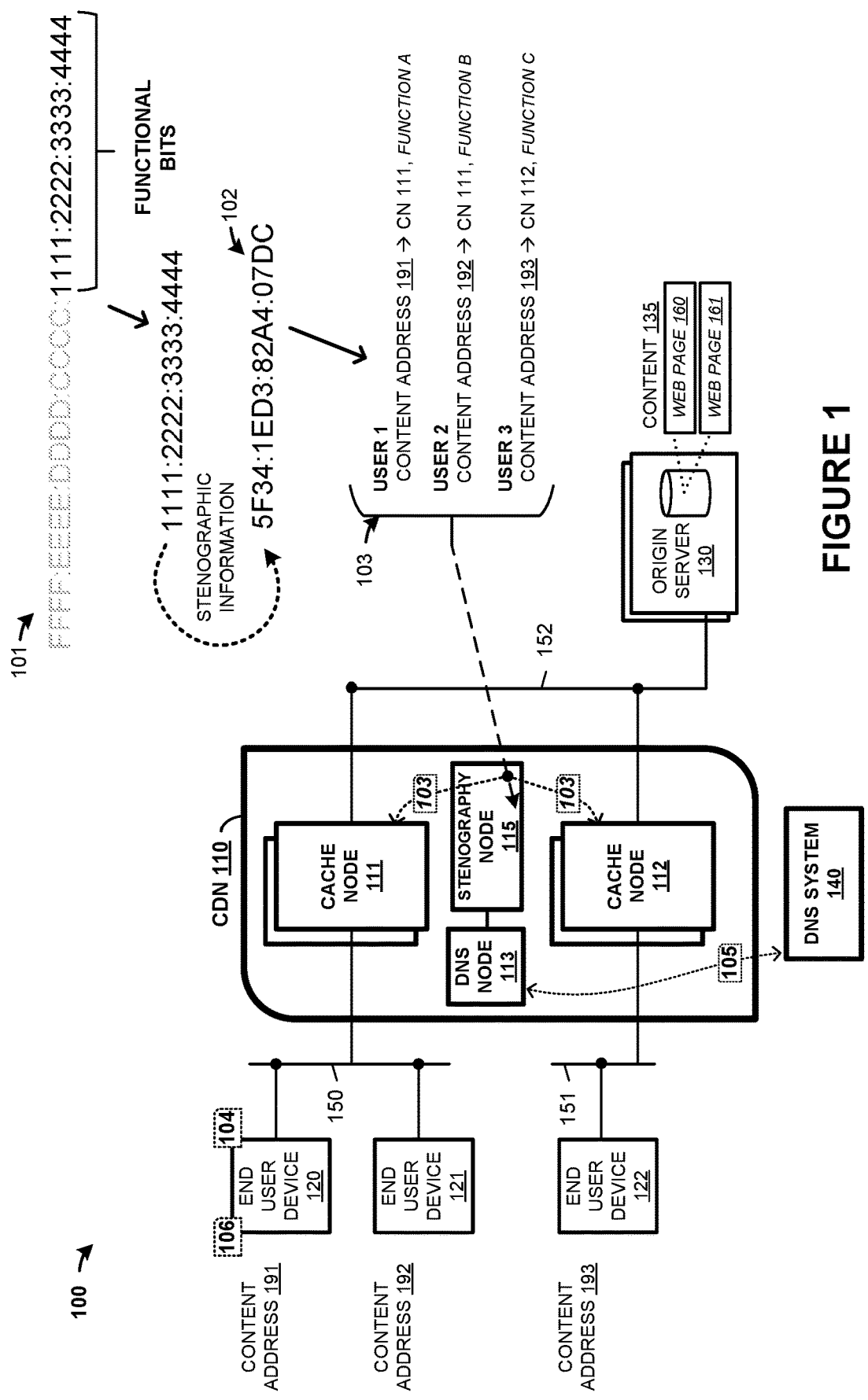
FIG. 1 illustrates a communication system.

Network content, such as web page content, typically includes content such as text, hypertext markup language (HTML) pages, pictures, video, audio, code, scripts, or other content viewable by an end user in a browser or other application. This various network content can be cached by the cache nodes of a content delivery network. The network content can include website content, pictures, video, other media, dynamic content, and other content, including combinations thereof.

Content delivery networks can add a layer of caching between origin servers of the content providers and the end users. The content delivery networks typically have one or more cache nodes distributed across a large geographic region to provide lower latency local access to the content for the end users. When end users request content, such as a web page, a selected cache node will respond to the content request instead of the associated origin server. Various techniques can be employed to ensure the cache node responds to content requests instead of the origin servers, such as associating web content of the origin servers with network addresses of the cache nodes instead of network addresses of the origin servers using domain name system (DNS) registration and lookup procedures. Although cache nodes and origin servers are shown as different nodes in the examples herein, it should be understood that the origin servers and cache nodes can be included in one or more of the same nodes.

Internet Protocol version 6 (IPv6) has been established to overcome some of the shortcomings with IPv4, namely total address space limitations as well as other protocol limitations. This address space can be leveraged as IPv6 becomes implemented in more network elements and routing equipment. IPv4 provides 32-bit IP addressing, while IPv6 uses 128-bit addressing, providing for $2^{128}$ uniquely identifiable addresses. IPv6 addresses are represented as eight groups of four hexadecimal digits separated by colons, such as example IPv6 address 1111:FFFF:2222:EEEE:3333:DDDD:4444:CCCC. Other representations are possible, which can include more compact or less compact representations.

In some network routing examples, classless inter-domain routing (CIDR) can be employed, which includes a compact network address representation that uses a "slash prefix" notation after an initial set of address digits. This notation indicates how many digits or bits are relevant for routing associated packets, and routing equipment can use the quantity of digits indicated by the slash notation to select routing pathways. For example, an address with 1111:FFFF:2222::/40 indicates that the first 40 bits of the IPv6 address are employed for routing purposes while the remaining bits are used for other purposes, such as local routing, routing within a point-of-presence (POP), or other purposes. IPv4 can use different notations than IPv6, however the examples below will mainly employ IPv6 notations. The number of digits uses in the slash notation can vary, and typically only a maximum of 48 bits are employed in a prefixed notation, namely 1111:FFFF:2222::/48. The remaining bits in an IPv6 address, such as the least-significant 64 bits, can be used for local routing, among other uses. In the examples herein, a portion of the bits used in IPv6 addresses are employed for encoding various information and instructions, such as will be discussed below for the stenography, anonymization, and attack mitigation examples.

As a first example employing a content delivery network, FIG. 1 is presented. FIG. 1 is a system diagram illustrating communication system 100. Communication system 100 includes one or more user devices 120-122, content delivery network (CDN) 110, one or more origin servers 130, and domain name system (DNS) 140. CDN 110 further includes a plurality of cache nodes 111-112, DNS node 113, and stenography node 115. Cache nodes 111-112 can be arranged at one or more physical sites or points-of-presence (POPs), among other arrangements. Cache nodes 111-112 provide content to end user devices 120-122 over various network links and packet networks, such as shown for packet links 150-151. Cache nodes 111-112 cache content for delivery to end user devices 120-122, where the content may be originated at origin server 130, among other origin servers and systems. In this example, content associated with web pages 160-161 can be cached by cache nodes 111-112.

In operation, an end user device, such as end user device 120, browses content in a user application, such as a web browser, mobile app, or other application. This content is referenced by a domain name, uniform resource locator (URL), uniform resource identifier (URI), or other identifier. Typically, these identifiers are not numerical network addresses, and the end user device must perform a domain name system (DNS) translation process to receive a numerical network address which can be used to request content and is routable by network routing elements.

This DNS process includes transferring a DNS query message to a DNS system or DNS node that serves the end user device. This DNS query message indicates at least a domain name which is to be translated into a network address. This DNS query message can be forwarded or recursed to further DNS nodes, such as DNS node 113 associated with CDN 110. In FIG. 1, end user device 120, for example, can issue DNS query 104 for delivery to DNS system 140. DNS system 140 can recurse this DNS query to DNS node 113 of CDN 110 in DNS query 105. DNS node 113 returns a network address to DNS system 140 which is then delivered to end user device 120. End user device 120 can then issue one or more content requests 106 for content associated with the domain name using packets addressed using the network address received in the DNS query process. One of the cache nodes of CDN 110 can receive the content requests and respond with content for delivery to end user device 120.

However, end user device 120 might be a malicious device, such as a network attacker performing a denial-of-service (DoS) attack or associated with a distributed denial-of-service (DDoS) attack. In other examples, specialized functions or operations might be desired for handling or responding to content requests from a particular end user device. In FIG. 1, information can be encoded into the network addresses provided to end user devices to indicate specialized functions or to include various information when content requests using those network addresses are received by cache nodes. This can be referred to as stenography, and stenographic information is encoded into a portion of the network addresses.

In IPv6 network addresses, as discussed above, 128 bits are employed to address an endpoint. However, in the examples herein, an upper portion is employed to route traffic to a particular cache node of CDN 110. This upper portion can be indicated by a prefixed portion of an IPv6 address, such as a shown in FIG. 3 for /40 thru /64 prefixed addresses. A lower portion can be used to encode various information or functions as will be discussed below.

Figure 2:
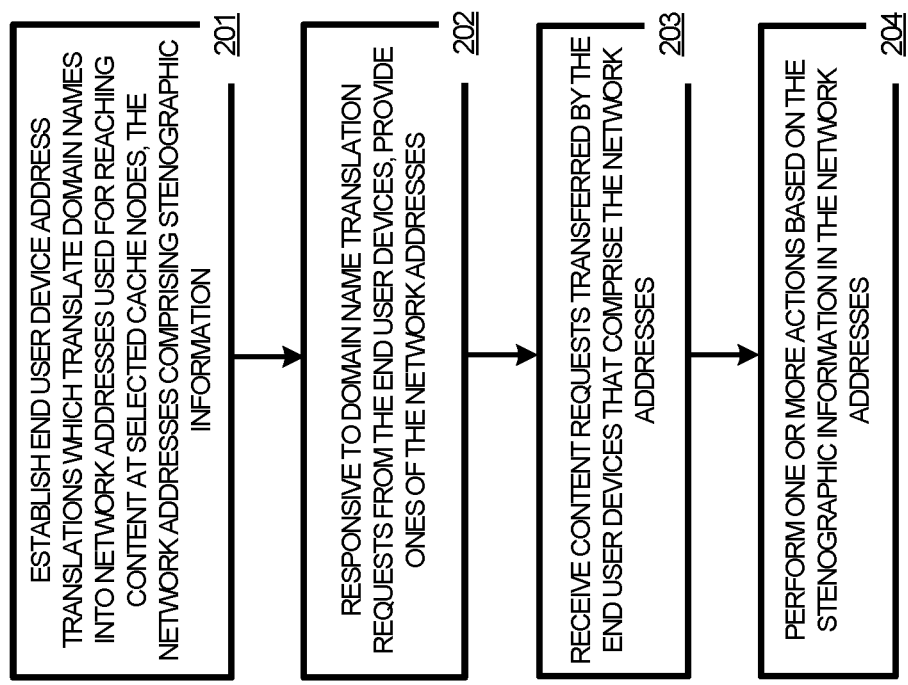
FIG. 2 illustrates a method of operating a communication system.

To provide another example operation of the elements of system 100, FIG. 2 is presented. In FIG. 2, stenography node 115 establishes (201) end user device address translations which translate domain names into network addresses used for reaching content at selected cache nodes, the network addresses comprising stenographic information. Example address translations are shown in FIG. 1 as configuration 103. IPv6 address structure 101 in FIG. 1 shows an upper portion of bits and a lower portion of bits, with the lower portion reserved for functional bits and used to encode stenographic information. Stenography node 115 can encode or otherwise incorporate stenographic information into these functional bits.

Specifically, configuration 103 includes three user addresses which can be provided to end user devices 120-122 for reaching content cached by ones of cache node 111-112. These address translations provide for translation between domain names or other URL information and network addresses.

The stenographic information can comprise various encoded information, which can be included in network addresses of content requests issued by end user devices, and once received, interpreted by cache nodes 111-112 or transferred to stenography node 115 for interpretation. The stenographic information can be encrypted, scrambled, or otherwise encoded into an IPv6 address. The stenographic information can include identifiers, such as watermarking information, to track end users or content request for certain content providers, domain names, or to track which networks are used to route content requests, among other tracking information. The stenographic information can indicate functions or actions to be taken responsive to receiving content requests that include the stenographic information, such as logging functions, traffic handling functions, traffic blocking functions, or other functions. These functions can be executed by cache nodes or other nodes in CDN 110. The stenographic information can be established per-content request, per-packet, per-user application, per-content/domain, per-website, per-end user identity, among others.

Stenography node 115 can provide these translations to DNS node 113 of CDN 110 to be used for DNS queries or DNS translation requests. Responsive to domain name translation requests transferred by the end user devices, DNS system 113 provides (202) ones of the network addresses. DNS system 113 can receive these domain name translation requests as recursed ones from DNS system 140 in some examples, or might receive them without a recursive structure. As seen in FIG. 1, end user device 120 receives content address 191 responsive to a DNS translation request, such as for a domain name associated with web page 160 or 161. End user device 121 receives content address 192 responsive to a DNS translation request, such as for a domain name associated with web page 160 or 161. End user device 122 receives content address 193 responsive to a DNS translation request, such as for a domain name associated with web page 160 or 161.

Once end user devices 120-122 receive any associated domain name translations, these user devices can include the provided network addresses (which include the stenographic information) in content requests to retrieve content. Cache nodes 111-112 receive (203) the content requests transferred by the end user devices that comprise the network addresses. Cache nodes 111-112 perform (204) one or more actions based on the stenographic information in the network addresses. As seen in FIG. 1, content address 191 is received by cache node 111, and associated with function A. Content address 192 is received by cache node 111, and associated with function B. Content address 193 is received by cache node 112, and associated with function C. These functions are then performed at the associated cache node or indications of the functions can be provided to stenography node which performs the functions. As mentioned above, the functions can include specialized tracking, logging, traffic handling, traffic dropping, or other functions.

Advantageously, elements of CDN 110, such DNS resolver nodes, can return specially-crafted IP addresses for a subset of DNS queries. At least a portion of each of the IP addresses can be encoded by the DNS resolver or control node in order to mark, or taint, any subsequent content requests. For example, if an operator of CDN 110 suspects malicious requests are being received from a specific locality 'A' (e.g., ISP 'C' in Virginia) for a specific service 'X' (such as web page 160), then DNS node(s) which are used by end user devices issuing DNS queries from locality 'A' can be singled-out by CDN 110. Specifically, DNS queries from locality 'A' querying about service 'X' can responsively prompt the DNS node(s) to return IP addresses which get routed to a cache node which caches service 'X'. These IP addresses also encode additional information or actions such as logging actions, traffic drop actions, among others. In the cache nodes which receive content requests with IP addresses having the encoded information, the embedded actions can be performed. This process allows CDN operators or customers to enforce a high level of functionality based on DNS responses, such as "log all content requests for my content/service which are coming from China," or "drop all network traffic coming for content requests resolving from outside the US," or "drop all network traffic for content requests associated with service 'X' which originate from locality 'A' for a specified period of time. This process also makes possible to enforcement of DNS use. For example, if a network-based attacker keeps issuing attack traffic to a specific network address, CDN 110 might select to no longer return that address responsive to DNS queries.

Figure 3:
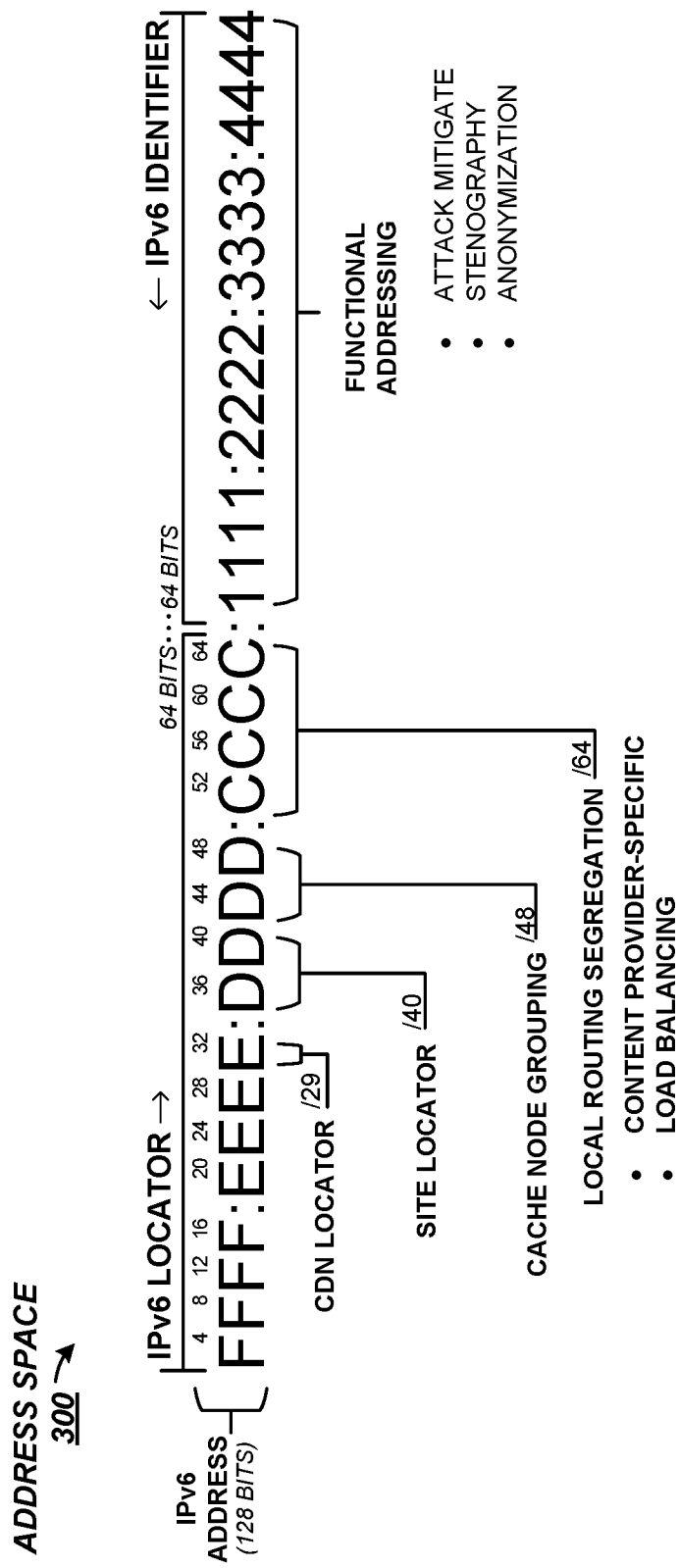
FIG. 3 illustrates an example address space.

As a specific example of the addressing employed in the examples herein, FIG. 3 is presented. FIG. 3 illustrates address space 300 which shows an example breakdown of the 128-bit address space of an IPv6 address. The prefixed indicators, such as /29, /40, /48, /64, and the like, indicate how many of the most significant digits of the address are relevant for routing purposes. For example, a /40 prefix indicates that the upper-most 40 bits of an address are considered.

In the example in FIG. 3, a /29 prefix corresponds to the entire content delivery network, and indicates that traffic should be routed to the content delivery network, such as CDN 110 in FIG. 1. A /40 indicates a particular site. The site can comprise a geographic location but can also have less physical distinctions that mere physicality. For example, a site can span more than one POP. A site might indicate a particular data center or multiple data centers that serve a particular geographic area or serve links groups by related traffic latencies. Cache node grouping /48 can indicate a particular cache node or collection of cache nodes which are in a load-balancing configuration and serve content. Local routing segregation /64 can segregate network traffic among different content types, such as video, audio, web page content, or other traffic segregations. For example, a /64 prefix can be employed for content-provider specific segregation or tracking, or might be employed for load balancing among cache nodes at a site or POP. Typically, only /48 specificity is reported to network providers in announcement messages, and further prefixing is reserved for routing local to a site or within a POP or cache node. The remaining least-significant bits in address space 300 beyond /64 can be employed for functional endpoint addressing, such as network addresses for specific endpoints, network interface cards, and the like. However, in some of the examples herein, these lower 64 bits can be employed for other purposes, such as functional addressing. This functional addressing can include attack mitigation, stenographic, and node anonymization, among others.

Returning to the elements of FIG. 1, CDN 110 can include multiple sites which each include one or more cache nodes. CDN 110 can also include network routing equipment, packet handling equipment, network links, management systems, and other elements. Content delivery network 110 handles delivery of network content to end user devices, such as end user device 120. The network content includes web content, media content, videos, audio, pictures, news, database information, and the like. Cache nodes of content delivery network 110, such as cache nodes 111-112, cache content for delivery to end user devices. The content can be originated at various other systems, such as origin server 130. In some examples, network content includes dynamic network content, and processes executed by cache nodes 111-112 create the dynamic content.

Cache nodes 111-112 can each include communication interfaces, network interfaces, processing systems, computer systems, microprocessors, storage systems, storage media, or some other processing devices or software systems, and can be distributed among multiple devices. Examples of cache nodes 111-112 can each include software such as an operating system, logs, databases, utilities, drivers, caching software, networking software, and other software stored on non-transitory computer-readable media.

End user devices 120-122 can be a user device, subscriber equipment, customer equipment, access terminal, smartphone, personal digital assistant, computer, tablet computing device, e-book, Internet appliance, media player, game console, smartwatch, or some other user communication apparatus, including combinations thereof. Although one end user device is shown in FIG. 1, it should be understood that any number of end user devices can instead be included, distributed over a large geographic area, and each end user device can be distributed among multiple devices or virtual devices.

Origin server 130 can include communication interfaces, network interfaces, processing systems, computer systems, microprocessors, storage systems, storage media, or some other processing devices or software systems, and can be distributed among multiple devices. Examples of origin server 130 can include software such as an operating system, logs, databases, utilities, drivers, networking software, and other software stored on a computer-readable medium.

Stenography node 115 can include communication interfaces, network interfaces, processing systems, computer systems, microprocessors, storage systems, storage media, or some other processing devices or software systems, and can be distributed among multiple devices. Examples of stenography node 115 can include software such as an operating system, logs, databases, utilities, drivers, caching software, networking software, and other software stored on non-transitory computer-readable media.

DNS system 140 and DNS node 113 each performs IP address translation services for end user devices, such as translating domain names into IP addresses. In some examples, DNS system 140 delegates domain name translation to another DNS system, such as DNS node 113. In such examples, elements of DNS node 113 can be included in control node 140 or other equipment. DNS system 140 and DNS node 113 can each include communication interfaces, network interfaces, processing systems, computer systems, microprocessors, storage systems, storage media, or some other processing devices or software systems, and can be distributed among multiple devices. Examples of DNS system 140 and DNS node 113 can each include software such as an operating system, logs, databases, utilities, drivers, caching software, networking software, and other software stored on non-transitory computer-readable media.

Communication links 150-152 each use metal, glass, optical, air, space, or some other material as the transport media. Communication links 150-152 can each use various communication protocols, such as wireless communications, cellular communications, Long Term Evolution (LTE), IEEE 802.11 (WiFi), Internet Protocol (IP), Ethernet, synchronous optical networking (SONET), hybrid fiber-coax (HFC), circuit-switched, communication signaling, or some other communication format, including combinations, improvements, or variations thereof. Communication links 150-152 can each be a direct link or can include intermediate networks, systems, or devices, and can include a logical network link transported over multiple physical links. In some examples these intermediate networks include local Internet Service Providers (ISPs) through which endpoints, such end user devices or origin servers, receive local last-mile access to the Internet and to backhaul networks.

Links 150-152 can include one or more backhaul networks that each comprise one or more packet networks configured to route packet communications between endpoints over network links. Backhaul networks can include routers, bridges, switches, management systems, network links, and other network routing and handling equipment, including combinations thereof. Each backhaul network is typically operated by a distinct service operator, service provider, or company to provide Internet routing services to a variety of customers. In some examples, each of backhaul networks comprise long-haul communication service providers and route packet communications over network links between smaller local ISPs.

Although one main link for each of links 150-152 is shown in FIG. 1, it should be understood that links 150-152 are merely illustrative to show communication modes or access pathways. In other examples, further links can be shown, with portions of the further links shared and used for different communication sessions or different content types, among other configurations. Communication links 150-152 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 4:
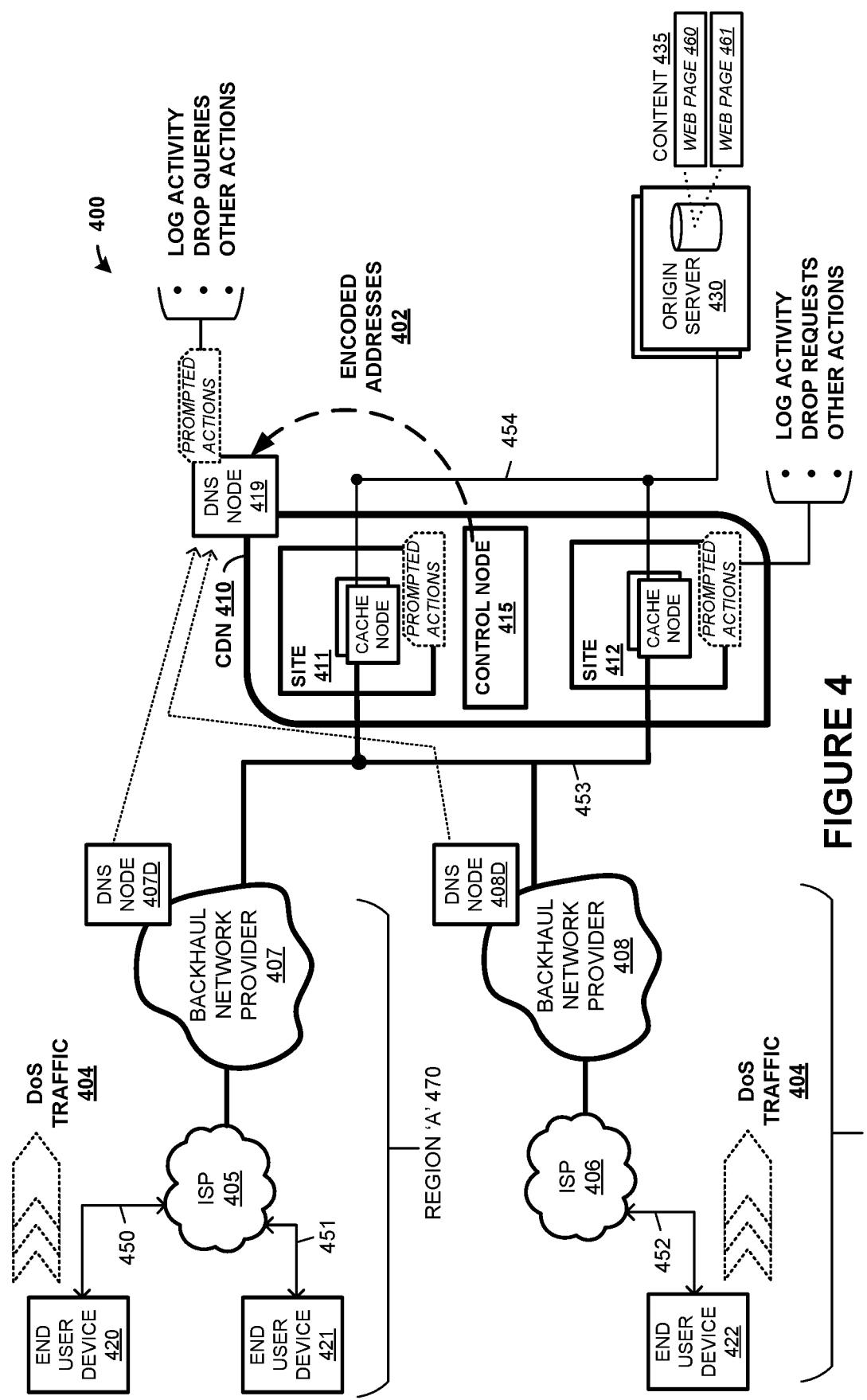
FIG. 4 illustrates a communication system.

As another example of functional addressing to mitigate attacks, FIG. 4 is presented. FIG. 4 is a system diagram illustrating system 400. System 400 includes CDN 410 which includes cache sites 411-412, as well as control node 415 and DNS node 419. System 400 includes Internet service providers 405-406, backhaul providers 407-408, end user devices 420-422, and origin servers 430. Each backhaul providers 407-408 includes at least one associated DNS node, namely DNS node 407A and 407B. The elements of FIG. 4 can include similar elements as found in FIG. 1 and provide further examples of the operation of the elements of system 100, although variations are possible.

Backhaul network providers 407-408 and ISPs 405-406 each comprise one or more packet networks with various routers, packet links, and other network elements which route traffic between endpoints. In some examples, backhaul network providers 407-408 comprise long-haul packet networks which route network traffic between other networks, and can act as backbone networks. ISPs can comprise local last-mile network providers, and typically provide network or Internet access to end user devices and other endpoint devices. and link those endpoints and devices to backhaul networks, such as backhaul network providers 407-408. Links 450-454 comprise one or more packet links which can include wired or wireless connections.

Cache sites 411-412 further comprise one or more cache nodes that can be arranged at one or more physical sites as shown in FIG. 4, or into one or more logical groupings such as points-of-presence (POPs), among other arrangements. For example, FIG. 4 shows two geographic regions, namely with region 'A' 470 and region 'B' 461. These regions can have different ISPs and backhaul network providers, as well as sites or cache nodes associated therewith. Site 411 might be located in or associated with region 470, while site 412 might be located in or associated with region 471. Other geographic or regional configurations are possible. The cache nodes provide content to end user devices 420-422 over various network links and packet networks, such as shown for packet links 450-153, ISPs 405-406, and backhaul network providers 407-408. The cache nodes cache content for delivery to end user devices 420-422, where the content may be originated at origin server 430, among other origin servers and systems. In this example, content associated with web pages 460-461 can be cached by the cache nodes.

In operation, an end user device, such as end user device 420, browses content in a user application, such as a web browser, mobile app, or other application. This content is referenced by a domain name, URL, URI, or other identifier. Typically, these identifiers are not numerical network addresses, and the end user device must perform a domain name system DNS translation process to receive a numerical network address which can be used to request content and is routable by network routing elements.

This DNS process includes transferring a DNS query message to a DNS system or DNS node that serves the end user device. This DNS query message indicates at least a domain name which is to be translated into a network address. This DNS query message can be forwarded or recursed to further DNS nodes, such as DNS node 421 associated with CDN 410. In FIG. 4, end user device 420, for example, can issue a DNS query for delivery to DNS node 407D. DNS node 407D can recurse this DNS query to DNS node 419 of CDN 410 in a DNS query. DNS node 419 returns a network address to DNS node 407D which is then delivered to end user device 420. End user device 420 can then issue one or more content requests for content associated with the domain name using packets addressed using the network address received in the DNS query process. One of the cache nodes of CDN 410 can receive the content requests and respond with content for delivery to end user device 420.

However, as shown in FIG. 4, end user device 420 might be a malicious device, such as a network attacker performing a denial-of-service (DoS) attack or associated with a distributed denial-of-service (DDoS) attack. In IPv6 network addresses, as discussed above, 128 bits are employed to address an endpoint. However, in the examples herein, an upper portion is employed to route traffic to a particular cache node of CDN 410. This upper portion can be indicated by a prefixed portion of an IPv6 address, such as a shown in FIG. 3 for /40 thru /64 prefixed addresses. A lower portion can be used to encode various information or functions to mitigate attacks or to identify locations, user devices, or other properties associated with an attack.

Figure 5:
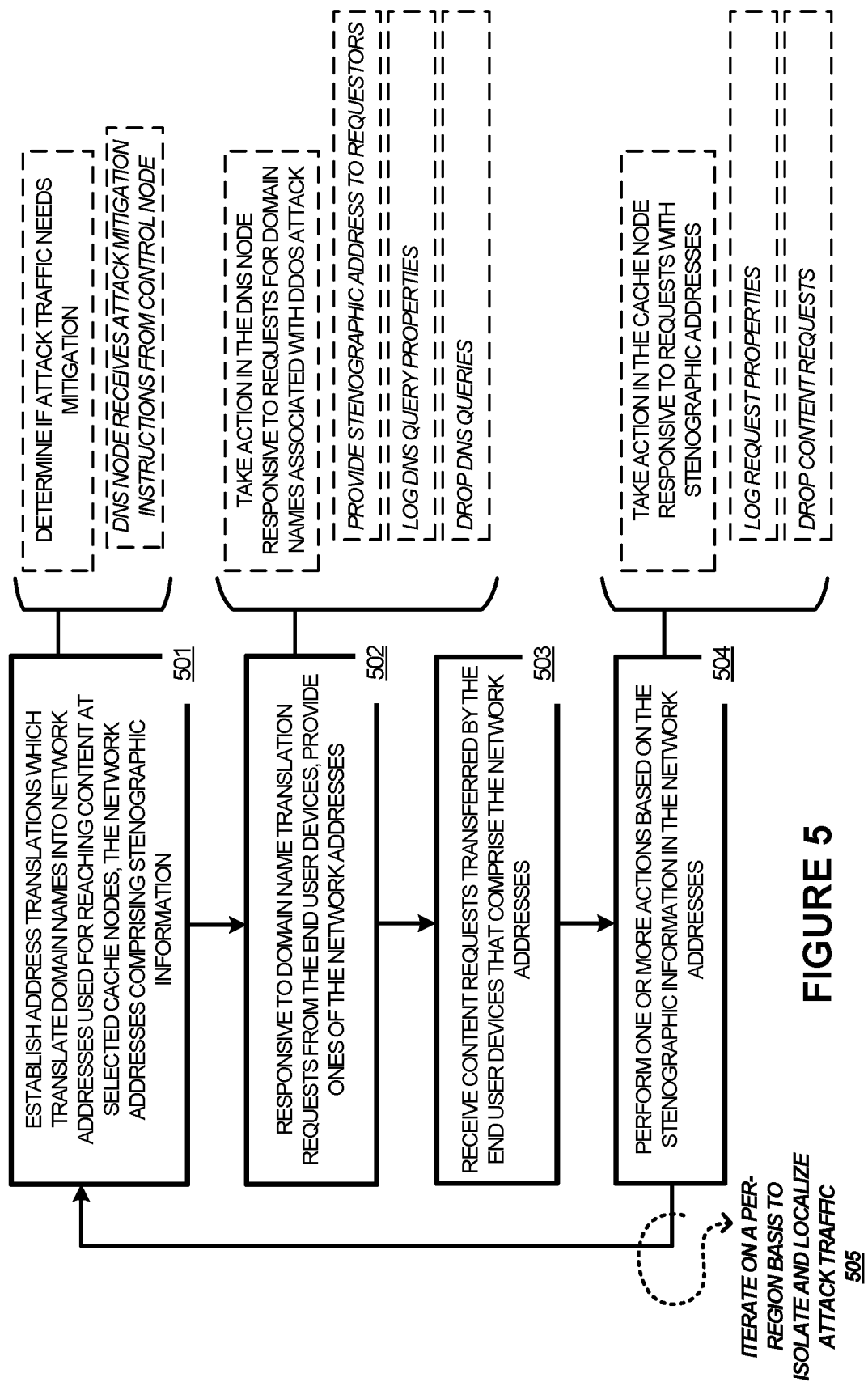
FIG. 5 illustrates a method of operating a communication system.

To provide another example operation of the elements of system 400, FIG. 5 is presented. In FIG. 5, a method is presented which can identify and isolate attack traffic, such as network traffic associated with denial-of-service attacks or distributed-denial-of-service attacks. Specifically, stenographic information is encoded into the lower-order bits of an IPv6 address to allow DNS nodes and cache nodes to track, isolate, and perform other functions. To aid in targeted isolation of attack traffic, first a localization process is performed to identify network elements or physical locations associated with attack traffic. This localization process can localize attack traffic to a particular backhaul network, ISP, end user device or collection of end user devices. Since a cache node can serve many different end user devices and those end user devices might not have a one-to-one relationship between content requests and cache nodes, this process can identify attack traffic as being associated with particular networks so those networks or even endpoints can be isolated and mitigated while allowing non-attack traffic to still be serviced. Thus, end user devices can be directed to the same content or cache nodes but have different stenographically-encoded network addresses which aid CDN 410 in mitigating network attacks. These encoded network addresses might comprise encoded instructions, encoded location information, or watermarking which can be used to identify and partition particular traffic.

Turning now to FIG. 5, control node 415 establishes (501) address translations which translate domain names into network addresses used for reaching content at selected cache nodes, the network addresses comprising stenographic information. As shown in FIG. 1, IPv6 address structure 101 shows an upper portion of bits and a lower portion of bits, with the lower portion reserved for functional bits and used to encode stenographic information. Control node 415 can encode or otherwise incorporate stenographic information into these functional bits.

The stenographic information can comprise various information, which can be included in network addresses of content requests issued by end user devices, and once received, interpreted by cache nodes at sites 411-412 or transferred to control node 415 for interpretation. The stenographic information can be encrypted, scrambled, or otherwise encoded into an IPv6 address. The stenographic information can include identifiers, such as watermarking information, to track end users or content request for certain content providers, domain names, or to track which networks are used to route content requests, among other tracking information. The stenographic information can indicate functions or actions to be taken responsive to receiving content requests that include the stenographic information, such as logging functions, traffic handling functions, traffic blocking functions, or other functions. These functions can be executed by cache nodes or other nodes in CDN 410. The stenographic information can be established per-content request, per-packet, per-user application, per-content/domain, per-website, per-end user identity, among other distinctions.

When control node 415 determines that malicious traffic or a network attack should be mitigated, then further action can be taken by control node 415, and address translations can be tailored to mitigate the attack traffic. This mitigation can begin by first identifying a locality of from which the attack traffic originates or at least enters onto a particular ISP or backhaul network. This locality can include a geographic or physical locality, such as geographic region 'A' 470 and region 'B' 471 shown in FIG. 4. This locality can include a logical or network topological locality, such as indicated by the relationships between ISPs, backhaul providers, and other routing or logical relationships. Combinations of locality can be determined as well.

To aid in identifying a locality of the traffic, control node 415 can establish address translations which are customized to a particular geographic locality or network locality, and distribute these address translations to DNS nodes associated with the various regions or network locality. For example, control node 415 can establish address translations for DNS node 407D and 408D which are different from each other, and use different stenographic information in IPv6 addresses provided to the two DNS nodes. This difference in address translations and stenographic information can aid in localizing from which DNS node the address translations are requested. Control node 415 can provide these translations to DNS node 419 of CDN 410 to be used for DNS queries or DNS translation requests.

DNS node 419 can be further provided with instructions by control node 415 which are correlated to address translations or instructions regarding handling of address translations. In this example, DNS queries can be recursed to DNS node 419 from any of DNS node 407D or 408D, and DNS node 419 can perform actions based on various DNS query properties. These DNS query properties can include the domain name requested for translation, the source address of the DNS query (i.e. the address of the end user device which originally issued the DNS query), or upon other factors, such as indications that particular content is experiencing malicious traffic-based attacks. These actions can be prompted by receiving a DNS query from DNS node 407D or 408D, or from other sources. These actions can include logging information about the DNS queries, such as a time/day of receipt, a source address, intermediary network information including ISP, backhaul provider, or top-level DNS node properties, a geographic region in which the top-level DNS node is located, the domain name requested for translation, URI/URL properties of the DNS query, or other properties. These actions can include executing a particular function, such as dropping traffic associated with DNS requests or inhibiting response to DNS request for requests corresponding to particular domain names, particular source addresses or source address ranges, traffic associated with particular ISPs, backhaul provider networks, geographic regions, or other traffic properties. Alerts can be triggered by the above properties which deliver alert messages to control node 415 or other elements of CDN 410. In further examples, DNS node 419 might responsively transfer messages to DNS nodes 407D or 408D which command DNS nodes 407D or 408D to remove a particular domain name or URL from the address translation tables or from CNAME records maintained or referenced by DNS nodes 407D or 408D.

Responsive to domain name translation requests issued by the end user devices, DNS node 419 can provide (502) selected ones of the network addresses. The DNS queries or DNS translation requests can be issued by the end user devices responsive to user content browsing or to malicious requests, such as bots or DoS/DDoS malware, which can relate to content associated with example web pages 160 or 161, among other content. DNS node 419 can receive these domain name translation requests, as recursed from any of DNS nodes 407D or 408D in some examples. As mentioned above, DNS node 419 can provide network addresses which include stenographic information in lower-order bits of the network addresses. The stenographic information, can encode locality information or indicate a particular function or functions to be executed by a cache node once content requests using those network addresses are included in content requests issued by end user devices. DNS node 419 can also execute one or more functions or actions based on the DNS queries, such as logging DNS query properties, dropping DNS queries, among other actions mentioned above.

If end user devices 420-422 receive domain name translations responsive to DNS queries, these end user devices can include the provided network addresses (which include the stenographic information) in content requests to retrieve content. Cache nodes at sites 411-412 can receive (503) the content requests transferred by the end user devices that comprise the network addresses. In some examples, the cache nodes can deliver content responsive to the content requests, such as when malicious traffic is not associated with the content requests.

However, cache nodes at sites 411-412 can perform (504) one or more prompted actions based on the stenographic information in the network addresses. Properties associated with the content requests can be logged. These properties can include the identities of the content being requested, source addressing of the content requests, time/day of the content requests, geographic locations associated with the content requests, intervening network properties, such as identities of ISPs or backhaul network providers, among other properties.

When DDoS traffic is associated with the content requests, such as when the content requests are included in DDoS traffic 404 which is a part of a malicious network-based attack, then further actions can be taken by the cache nodes. For example, the stenographic information might include instructions, once decoded from the stenographic information, to log properties associated with the malicious requests. The instructions may indicate to drop content requests or ignore content requests which include certain stenographic information. The instructions may indicate to transfer logged information to control node 415 or indicate various properties of the content requests to control node 415.

To identify any prompted instructions, indicators, or other information contained or encoded within the stenographic portions of the network addresses, cache nodes can process the network addresses against a list of addresses provided by control node 415 which correlates at least stenographic content of network addresses to instructions, indicators, or other information. In other examples, a decode process is performed to translate the stenographic portions of the network addresses into decoded portions which correspond to or indicate the instructions, indicators, or other information. In yet further examples, the cache nodes provide the stenographic portions to control node 415 for decoding and handling according to the instructions, indicators, or other information. When the stenographic portions comprise encrypted information, then a decryption process can be performed by either the cache nodes or control node 415 to identify the instructions, indicators, or other information.

Advantageously, elements of CDN 410, such DNS node 419, can return customized IP addresses for a subset of DNS queries. At least a portion of each of the IP addresses can be encoded by the DNS node or control node in order to mark, or taint, any subsequent content requests. For example, if an operator of CDN 410 suspects malicious requests are being received from a specific region 'A' (e.g., backhaul provider 'C' in Oklahoma) for a specific service 'Y' (such as web page 461), then DNS node(s) which are reached by end user devices issuing DNS queries from region 'A' can be isolated by CDN 410. Specifically, DNS queries from region 'A' querying about service 'Y' can responsively prompt DNS node 419 to return IP addresses which get routed to a cache node which caches service 'Y'. These IP addresses also include additional stenographic information which prompt actions such as logging actions, traffic drop actions, among others. In the cache nodes which receive content requests with IP addresses having the stenographic information, the embedded actions can be performed. This process allows CDN operators or customers to enforce a high level of functionality based on DNS responses, such as "log all content requests for my content/service which are coming from region A," or "drop all network traffic coming for content requests resolving from outside the region B," or "drop all network traffic for content requests associated with service 'Y' which originate from region 'A' for a specified period of time. This process also makes possible to enforcement of DNS use. For example, if a network-based attacker keeps issuing attack traffic to a specific network address, CDN 410 might select to no longer return that address responsive to DNS queries.

To further localize and isolate attack traffic, such as DDoS traffic 404 in FIG. 4, an iterative process can be performed (505). For example, a network-based attack might be originating from particular regions or over particular network providers. Once an attack is detected by CDN 410, then a subset or subsets of potential sources of the attack traffic are marked using the stenographic information in provided IP addresses and logged via a first DNS node which serves a first geographic area or logical network partition, such as DNS nodes 407D or 408D which serve a particular backhaul network provider which can serve specific regions. The first DNS node can transfer this log information to control node 415 to identify localities, regions, or other network subdivisions from which the attack traffic appears to be originating. Control node 415 can also identify how much of the stenographically marked traffic is comprised of attack traffic versus non-attack traffic at that first DNS node, which can be identified by a ratio of attack/non-attack traffic, among other metrics. A second DNS node which serves a second geographic area or logical network partition can be instructed to provide stenographic IP addresses which can be used to identity further quantities of attack vs. non-attack traffic associated with the second DNS node. All remaining DNS nodes can be iterated through to determine amounts of attack traffic associated with each region or partition. In some cases, a particular DNS node might serve more than one geographic region or network partition, or more than one DNS node might serve the same geographic region or network partition. The iterative process can localize the attack traffic to a particular region or network partition by selectively providing the stenographically-marked IP addresses over time by the various DNS nodes. Once a threshold amount of attack traffic is detected by a particular DNS node, which can be localized using the iterative process, then those DNS nodes might be instructed to drop any further DNS queries associated with a particular traffic property. The traffic property, as indicated above, can include traffic for a particular domain name, for a particular content/service, for particular cache nodes, geographic regions, logical network partitions, or other traffic properties, including combinations thereof.

Figure 6:
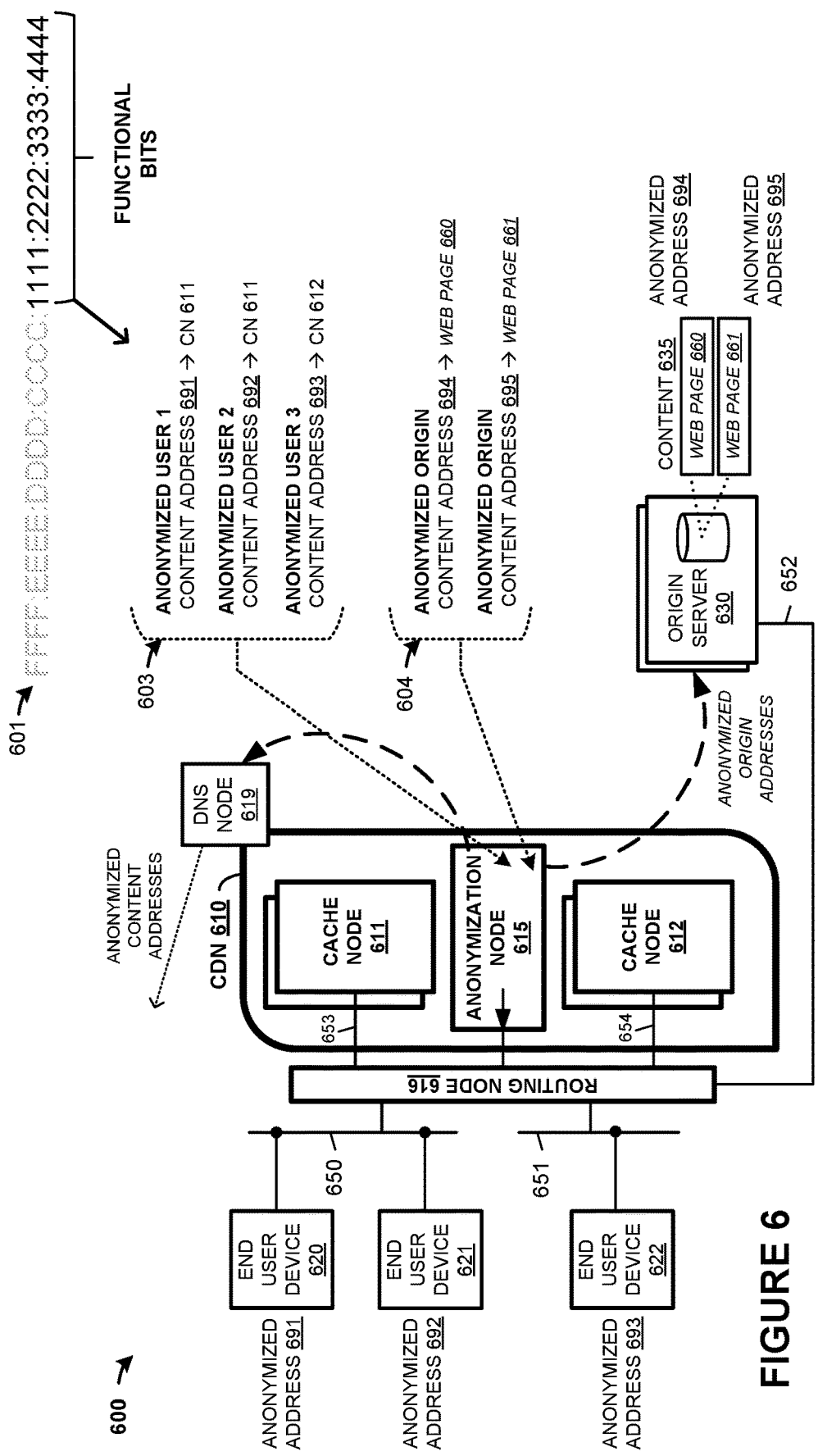
FIG. 6 illustrates a communication system.

In addition to stenographically marking network addresses, further functional addressing can be included in IP addresses. FIG. 6 is presented to illustrate examples of endpoint anonymization using IPv6 addresses. FIG. 6 is a system diagram illustrating communication system 600. Communication system 600 includes one or more user devices 620-622, CDN 610, one or more origin servers 630. CDN 610 further includes a plurality of cache nodes 611-612, anonymization node 615, and DNS node 619. Cache nodes 611-612 can be arranged at one or more physical sites or POPs, among other arrangements. Cache nodes 611-612 provide content to end user devices 620-622 over various network links and packet networks, such as shown for packet links 650-651. Cache nodes 611-612 cache content for delivery to end user devices 620-622, where the content may be originated at origin server 630, among other origin servers and systems. In this example, content associated with web pages 660-661 can be cached by cache nodes 611-612.

In operation, an end user device, such as end user device 620, browses content in a user application, such as a web browser, mobile app, or other application. This content is referenced by a domain name, uniform resource locator (URL), uniform resource identifier (URI), or other identifier. Typically, these identifiers are not numerical network addresses, and the end user device must perform a domain name system (DNS) translation process to receive a numerical network address which can be used to request content and is routable by network routing elements.

This DNS process includes transferring a DNS query message to a DNS system or DNS node that serves the end user device. This DNS query message indicates at least a domain name which is to be translated into a network address. In FIG. 6, end user device 620, for example, can issue a DNS query for delivery to DNS node 619. DNS node 619 might be reached using a recursed or hierarchical DNS structure with one or more DNS nodes. DNS node 613 returns a network address to end user device 620. End user device 620 can then issue one or more content requests for content associated with the domain name using packets addressed using the network address received in the DNS query process. One of the cache nodes of CDN 610 can receive the content requests and respond with content for delivery to end user device 620.

However, CDN 610 might desire to maintain anonymity and conceal identities among end user devices 620-622 or origin server 630 or to prevent blocking, throttling, monitoring, or identification of traffic associated with CDN 610 by intervening backhaul networks, ISPs, or a third party. In IPv6 network addresses, as discussed above, 128 bits are employed to address an endpoint. An upper portion is employed to route traffic to a particular cache node of CDN 610. This upper portion can be indicated by a prefixed portion of an IPv6 address, such as a shown in FIG. 3 for /40 thru /64 prefixed addresses. In the examples herein for system 600, a lower portion can be used to anonymize endpoint addressing, as will be discussed below. The anonymization of the bits of the network addresses can be performed using randomization techniques such as random number generators, pseudo-random number generators, or other numerical randomization techniques. Typically, the anonymization of the bits in the network addresses provides for ephemeral or temporary network addresses which are periodically altered or generated.

Figure 7:
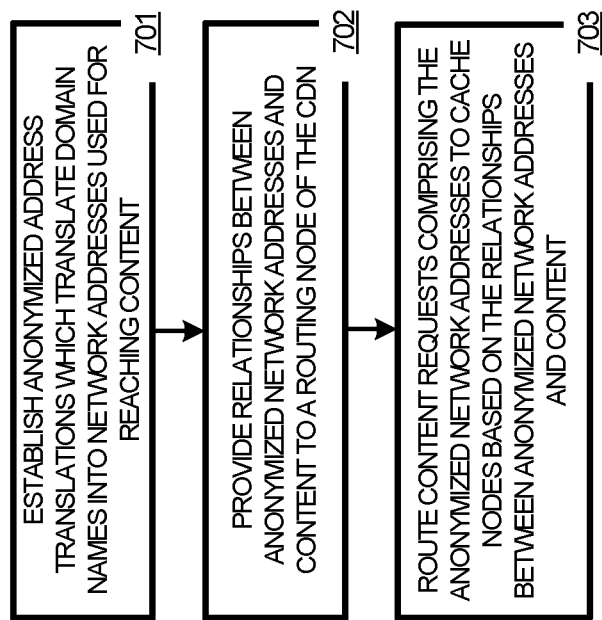
FIG. 7 illustrates a method of operating a communication system.

To provide an example operation of the elements of system 600, FIG. 7 is presented. In FIG. 7, anonymization node 615 establishes (701) end user device address translations which translate domain names into network addresses used for reaching content at selected cache nodes, the network addresses comprising stenographic information. Example address translations are shown in FIG. 6 as configuration 603. IPv6 address structure 601 in FIG. 6 shows an upper portion of bits and a lower portion of bits, with the lower portion reserved for functional bits and used to anonymize endpoints. Anonymization node 615 can anonymize the network addresses using these functional bits.

Specifically, configuration 603 includes three anonymized user addresses which can be provided to end user devices 620-622 for reaching content cached by ones of cache nodes 611-612. These address translations provide for translation between domain names or other URL information and network addresses. Configuration 604 includes two anonymized origin addresses which can be provided to origin server 630 to retrieve content for web pages 660-661, and will be discussed below. Each network address in configuration 603 and 604 comprises a different network address, with a first portion of upper address bits used for routing of associated traffic over backhaul networks, ISPs, and other networks like the Internet, while the lower order 'functional bits' are used for anonymization purposes. Thus, the upper address bits might not be anonymized, whereas the lower address bits are anonymized.

For content requests of end user devices, anonymization node 615 can establish anonymized network addresses (701) and provide (702) relationships or correlations between domain names and anonymized network addresses to DNS node 619. These anonymized network addresses are provided in response to DNS queries or DNS translation requests. The address correlations can be tailored or individualized with respect to various factors. In a first example, each end user device is provided with a different anonymized network address responsive to each DNS query. Correlations between domain names and cache nodes or content/services can be established in anonymization node 615 and provided to DNS node 619. In some cases, a list of many anonymized network addresses are provided to DNS node 619 for use in individual responses to DNS queries. Each DNS query for particular content can return a different anonymized address. In this manner, an identity of an end user device, content, and cache node can be concealed and anonymized.

CDN 610 routes (703) content requests comprising the anonymized network addresses to cache nodes based on the relationships between anonymized network addresses and content. To route traffic with the anonymized network addresses, the upper bits of associated IPv6 addresses can be non-anonymized and allow the traffic to be routed to CDN 610. However, routing within CDN 610 and associations with particular content or cache nodes still remain anonymized using the lower bits of associated IPv6 addresses. Once received into CDN 601, one or more routing nodes, such as routing node 616, can be provided with the correlations which allow routing node 616 to direct content requests to proper cache nodes of CDN 610 or can be used to de-anonymize the network addresses for usage and routing internal to CDN 610.

Figure 8:
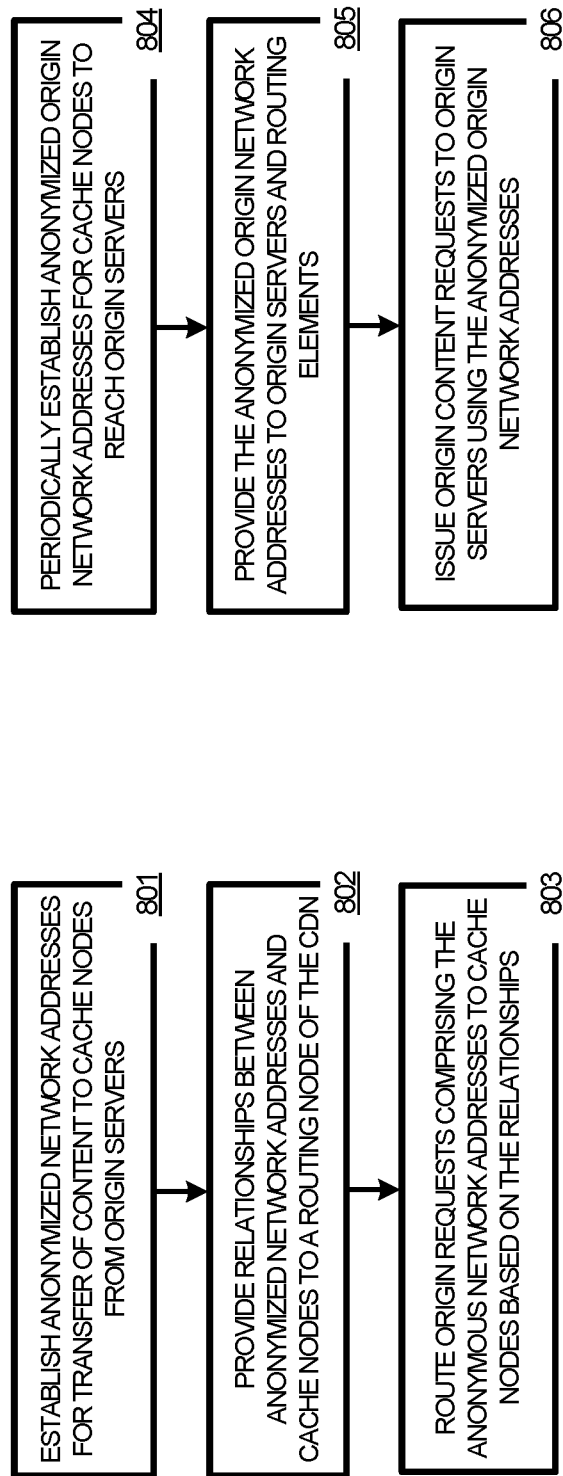
FIG. 8A illustrates a method of operating a communication system.
FIG. 8B illustrates a method of operating a communication system.

FIGS. 8A and 8B show further operations of CDN 610, in relation to retrieving origin content into cache nodes for caching of the origin content. In FIG. 8A, content requests are issued by cache nodes to retrieve origin content from origin servers, such as origin server 630, and anonymized network addresses can also be employed. In this example, a DNS translation process typically is not needed for cache nodes to retrieve content from origin servers. The cache nodes typically will know a network address for origin server 630 and can issue origin content request using these addresses. However, intervening network elements or packet networks might interfere with certain traffic or certain traffic types once that traffic is identified, such as a backhaul network between cache node 612 and origin server 630 which throttles video content or other content.

Thus, to prevent unwanted throttling of identified traffic or to further anonymize endpoints associated with CDN 610, anonymization node 615 can establish (801) anonymized network addresses for transfer of content to cache nodes of CDN 610 from origin servers, such as from origin server 630. These anonymized network addresses can be periodically established for each of the cache nodes of CDN 610 and used as source addresses in content requests issued by cache nodes to retrieve origin content on origin server 630. This can ensure anonymization of the return traffic for content transferred by origin servers to the cache nodes. Correlations between the cache nodes and the anonymized network addresses can be provided (802) to routing node 616. Incoming network traffic using these anonymized addresses can be routed (803) according to these relationships to ensure delivery of content transferred by origin servers into the proper cache nodes which issued content requests.

Turning now to FIG. 8B, anonymization node 615 can be employed to provide for further anonymization of origin content requests issued to origin servers by cache nodes. In contrast to FIG. 8A which uses anonymized network addresses as source addresses in origin content requests issued by cache nodes, FIG. 8B discusses using further anonymized network addresses as destination network addresses to reach the origin servers.

Anonymization node 616 periodically establishes (804) anonymized origin network addresses for cache nodes to reach origin servers, such as origin server 630. These anonymized network addresses can be established for each origin server, or can be based on other granularities, such as for each content/server or website. However, in order for the origin content requests to be properly delivered to origin servers, each origin server is periodically provided (805) with the anonymized network address or addresses to which the origin servers are to respond. Also, routing elements of the various packet networks over which network traffic is routed can be informed of the periodically altered network addresses. However, when only lower-order bits of network addresses are anonymized, then the routing elements might only be informed of changes when upper-level bits are altered which affect routing.

Cache nodes of CDN 610 can then issue (806) origin content requests to origin servers using the anonymized origin network addresses. Origin servers can responsively transfer the content to particular cache nodes based on the source network addresses provided in the origin content requests.

Advantageously, the operations in FIGS. 8A and 8B provide for anonymized transfer of origin content between cache nodes and origin systems. These anonymized network addresses can be rotated periodically to prevent identification or throttling of traffic based on specific network addresses. Thus, temporary network addresses are employed in many examples. In some examples, it becomes possible to inspect addresses in headers packets associated with network traffic to allow a network operator, network provider, or other entity to monitor or block network traffic associated with certain services (such as particular websites or particular types of content) without needing to inspect the data payloads of the packets. Although this inspection and identification of network traffic might be desirable in some cases, in other cases it might be desired to anonymize this network traffic to prevent monitoring, throttling, or blocking. For example, a backhaul network provider might throttle network traffic for a particular CDN or for traffic of a particular website to allow another CDN or website to perform better. These anonymous and ephemeral identifiers can be used for content or services which CDN 610 prefers to not have identified in transit.

Returning to the elements of FIG. 6, CDN 610 can include multiple sites which each include one or more cache nodes. CDN 610 can also include network routing equipment, packet handling equipment, network links, management systems, and other elements. Content delivery network 610 handles delivery of network content to end user devices, such as end user device 620. The network content includes web content, media content, videos, audio, pictures, news, database information, and the like. Cache nodes of content delivery network 610, such as cache nodes 611-612, cache content for delivery to end user devices. The content can be originated at various other systems, such as origin server 630. In some examples, network content includes dynamic network content, and processes executed by cache nodes 611-612 create the dynamic content.

Cache nodes 611-612 can each include communication interfaces, network interfaces, processing systems, computer systems, microprocessors, storage systems, storage media, or some other processing devices or software systems, and can be distributed among multiple devices. Examples of cache nodes 611-612 can each include software such as an operating system, logs, databases, utilities, drivers, caching software, networking software, and other software stored on non-transitory computer-readable media.

End user devices 620-622 can be a user device, subscriber equipment, customer equipment, access terminal, smartphone, personal digital assistant, computer, tablet computing device, e-book, Internet appliance, media player, game console, smartwatch, or some other user communication apparatus, including combinations thereof. Although one end user device is shown in FIG. 6, it should be understood that any number of end user devices can instead be included, distributed over a large geographic area, and each end user device can be distributed among multiple devices or virtual devices.

Origin server 630 can include communication interfaces, network interfaces, processing systems, computer systems, microprocessors, storage systems, storage media, or some other processing devices or software systems, and can be distributed among multiple devices. Examples of origin server 630 can include software such as an operating system, logs, databases, utilities, drivers, networking software, and other software stored on a computer-readable medium.

Anonymization node 615 can include communication interfaces, network interfaces, processing systems, computer systems, microprocessors, storage systems, storage media, or some other processing devices or software systems, and can be distributed among multiple devices. Examples of anonymization node 615 can include software such as an operating system, logs, databases, utilities, drivers, caching software, networking software, and other software stored on non-transitory computer-readable media.

DNS node 619 performs IP address translation services for end user devices, such as translating domain names into IP addresses. In some examples, a DNS system delegates domain name translation to DNS node 619. DNS node 619 can include communication interfaces, network interfaces, processing systems, computer systems, microprocessors, storage systems, storage media, or some other processing devices or software systems, and can be distributed among multiple devices. Examples of DNS node 619 can include software such as an operating system, logs, databases, utilities, drivers, caching software, networking software, and other software stored on non-transitory computer-readable media.

Communication links 650-654 each use metal, glass, optical, air, space, or some other material as the transport media. Communication links 650-654 can each use various communication protocols, such as wireless communications, cellular communications, Long Term Evolution (LTE), IEEE 802.11 (WiFi), Internet Protocol (IP), Ethernet, synchronous optical networking (SONET), hybrid fiber-coax (HFC), circuit-switched, communication signaling, or some other communication format, including combinations, improvements, or variations thereof. Communication links 650-654 can each be a direct link or can include intermediate networks, systems, or devices, and can include a logical network link transported over multiple physical links. In some examples these intermediate networks include local Internet Service Providers (ISPs) through which endpoints, such end user devices or origin servers, receive local last-mile access to the Internet and to backhaul networks.

Links 650-654 can include one or more backhaul networks that each comprise one or more packet networks configured to route packet communications between endpoints over network links. Backhaul networks can include routers, bridges, switches, management systems, network links, and other network routing and handling equipment, including combinations thereof. Each backhaul network is typically operated by a distinct service operator, service provider, or company to provide Internet routing services to a variety of customers. In some examples, each of backhaul networks comprise long-haul communication service providers and route packet communications over network links between smaller local ISPs.

Although one main link for each of links 650-654 is shown in FIG. 6, it should be understood that links 650-654 are merely illustrative to show communication modes or access pathways. In other examples, further links can be shown, with portions of the further links shared and used for different communication sessions or different content types, among other configurations. Communication links 650-654 can each include many different signals sharing the same associated link, as represented by the associated lines in FIG. 6, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 9:
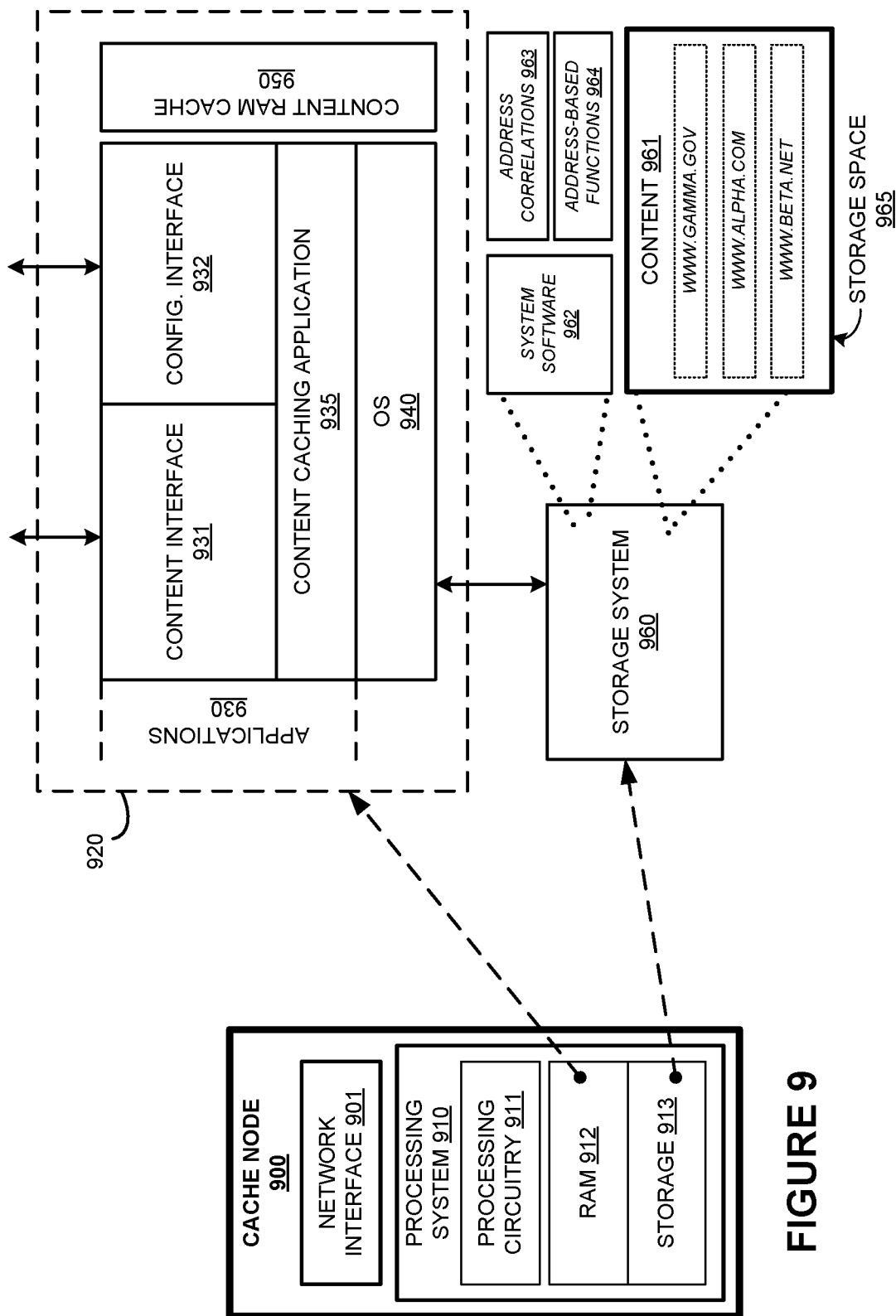
FIG. 9 illustrates a cache node.

To further describe the equipment and operation of a cache node, FIG. 9 is provided which illustrates cache node 900. Cache node 900 can be an example of cache nodes 111-112 of FIG. 1, cache nodes of sites 411-412 of FIG. 4, and cache nodes 611-612 of FIG. 6, although variations are possible. Cache node 900 includes network interface 901 and processing system 910. Processing system 910 includes processing circuitry 911, random access memory (RAM)

912, and storage 913, although further elements can be included, such as discussed in FIGS. 1, 4, and 6. Example contents of RAM 912 are further detailed in RAM space 920, and example contents of storage 913 are further detailed in storage system 960.

Processing circuitry 911 can be implemented within a single processing device but can also be distributed across multiple processing devices or sub-systems that cooperate in executing program instructions. Examples of processing circuitry 911 include general purpose central processing units, microprocessors, application specific processors, and logic devices, as well as any other type of processing device. In some examples, processing circuitry 911 includes physically distributed processing devices, such as cloud computing systems.

Network interface 901 includes one or more network interfaces for communicating over communication networks, such as packet networks, the Internet, and the like. The network interfaces can include one or more local or wide area network communication interfaces which can communicate over Ethernet or Internet protocol (IP) links. Network interface 901 can include network interfaces configured to communicate using one or more network addresses, which can be associated with different network links. Examples of network interface 901 include network interface card equipment, transceivers, modems, and other communication circuitry.

RAM 912 and storage 913 together can comprise a non-transitory data storage system, although variations are possible. RAM 912 and storage 913 can each comprise any storage media readable by processing circuitry 911 and capable of storing software. RAM 912 can include volatile and nonvolatile, removable and non-removable media implemented in any method or technology for storage of information, such as computer readable instructions, data structures, program modules, or other data. Storage 913 can include non-volatile storage media, such as solid state storage media, flash memory, phase change memory, magnetic memory, or as illustrated by storage system 960 in this example. RAM 912 and storage 913 can each be implemented as a single storage device but can also be implemented across multiple storage devices or sub-systems. RAM 912 and storage 913 can each comprise additional elements, such as controllers, capable of communicating with processing circuitry 911.

Software stored on or in RAM 912 or storage 913 can comprise computer program instructions, firmware, or some other form of machine-readable processing instructions having processes that when executed a processing system direct cache node 900 to operate as described herein. For example, software drives cache node 900 to receive requests for content, determine if the content is stored in cache node 900, retrieve content from origin servers, transfer content to end user devices, manage data storage systems for handling and storing the content, identify stenographic portions of network addresses, decode stenographic information include in network addresses to perform actions associated with the stenographic information, among other operations. The software can also include user software applications. The software can be implemented as a single application or as multiple applications. In general, the software can, when loaded into a processing system and executed, transform the processing system from a general-purpose device into a special-purpose device customized as described herein.

RAM space 920 illustrates a detailed view of an example configuration of RAM 912. It should be understood that different configurations are possible. RAM space 920 includes applications 930, operating system (OS) 940, and content RAM cache 950. Content RAM cache 950 includes RAM space for temporary storage of content, such as dynamic random access memory (DRAM).

Applications 930 include content interface 931, configuration interface 932, and content caching application 935. Content caching application 935 handles caching of content and management of storage spaces, such as content RAM cache 950 and storage space 965, as well as exchanges content, data, and instructions via content interface 931 and configuration interface 932. Content caching application 935 can comprise a custom application, Varnish caching software, hypertext transfer protocol (HTTP) accelerator software, or other content caching and storage applications, including variation, modifications, and improvements thereof. Applications 930, OS 940, and address correlations 963, address-based functions 964 can reside in RAM space 920 during execution and operation of cache node 900, and can reside in system software storage space 962 on storage system 960 during a powered-off state, among other locations and states. Applications 930 and OS 940 can be loaded into RAM space 920 during a startup or boot procedure as described for computer operating systems and applications.

Content interface 931 and configuration interface 932 each allow a user to interact with and exchange data with content caching application 935. In some examples, each of content interface 931 and configuration interface 932 comprise an application programming interface (API). Content interface 931 allows for exchanging content for caching in cache node 900 by content caching application 935, and can also receive instructions to purge or erase data from cache node 900. Content interface 931 can retrieve network and web page content from origin servers for delivery to end users. Configuration interface 932 allows for altering the configuration of various operational features of content caching application 935. In some examples, configuration interface 932 comprises a scripting language interface, such as Varnish Configuration Language (VCL), Perl, PHP, Javascript, or other scripting or interpreted language-based interfaces. Content interface 931, and configuration interface 932 can each communicate with external systems via network interface 901 over any associated network links. In further examples, one or more of elements 931-932 are implemented in VCL or VCL modules.

Content interface 931 can also the handling of functional addressing with regards to cache node 900. Specifically, when stenographic or anonymized addressing is employed, such as in the examples herein, cache node 900 can store address correlations 963, which comprises one or more data structures correlating content 961 and network addresses which might include stenographic/anonymized addresses. Moreover, content node 900 can perform one or more actions or functions based on received stenographic/anonymized addresses. These functions can be stored in address-based functions 964 which comprises one or more data structures with correlations between functions, such as logging, dropping, or redirection functions, and network addresses, such as stenographic/anonymized addresses.

Storage system 960 illustrates a detailed view of an example configuration of storage 913. Storage system 960 can comprise flash memory such as NAND flash or NOR flash memory, phase change memory, magnetic memory, among other solid state storage technologies. As shown in FIG. 9, storage system 960 includes system software 962, address correlations 963, address-based functions 964, as well as content 961 stored in storage space 965. As described above, system software 962 can be a non-volatile storage space for applications 930 and OS 940 during a powered-down state of cache node 900, among other operating software. Content 961 includes cached content, such as the web content, which can include text, data, pictures, video, audio, web pages, scripting, code, dynamic content, or other network content. In this example, content 961 includes network content and web pages associated with one or more websites, as indicated by www.gamma.gov, www.alpha.com, and www.beta.net.

Cache node 900 is generally intended to represent a discrete or distributed computing system with which at least software 930 and 940 are deployed and executed in order to render or otherwise implement the operations described herein. However, cache node 900 can also represent any computing system on which at least software 930 and 940 can be staged and from where software 930 and 940 can be distributed, transported, downloaded, or otherwise provided to yet another computing system for deployment and execution, or yet additional distribution.

Figure 10:
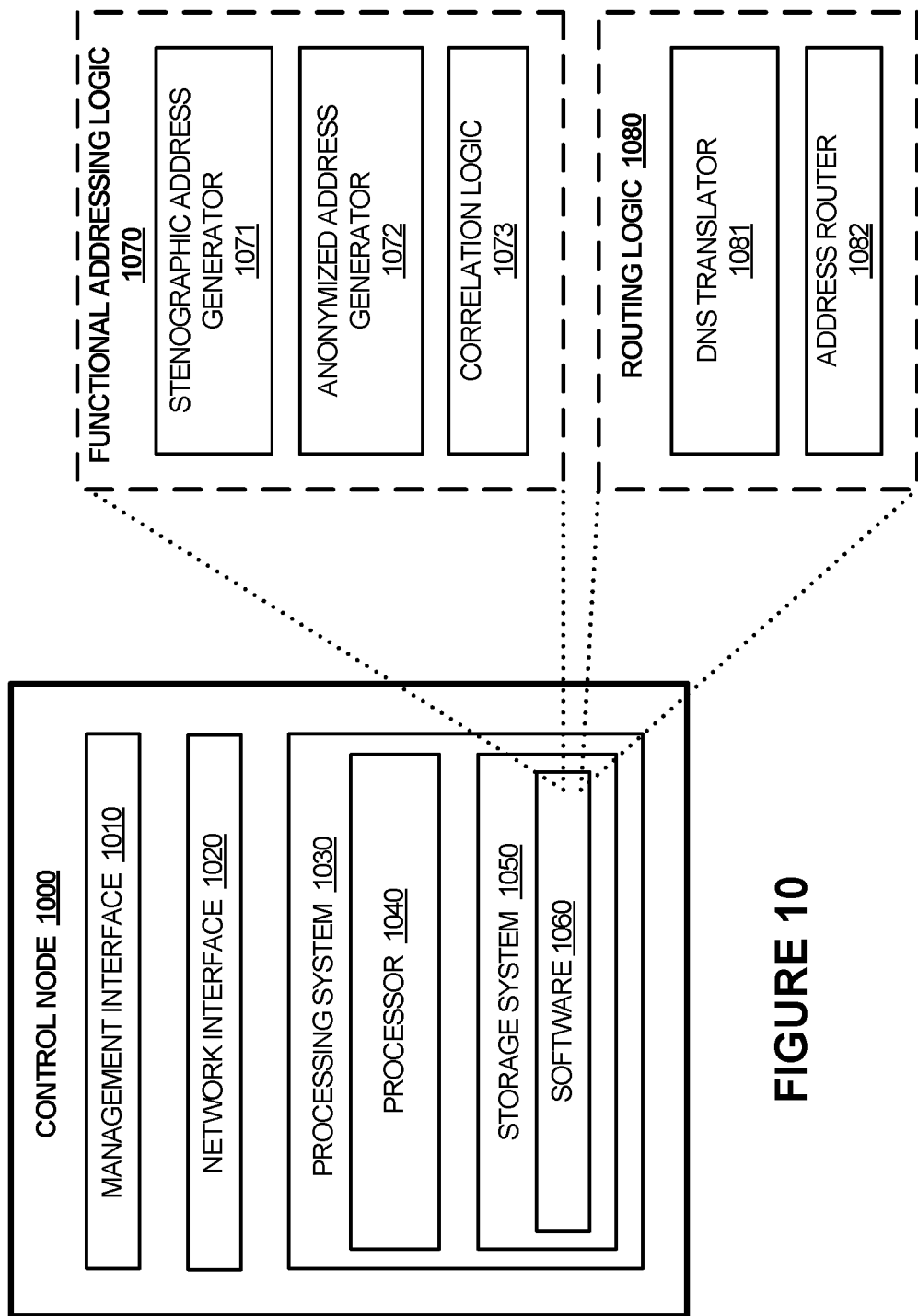
FIG. 10 illustrates a control node.

FIG. 10 illustrates the internal configuration of control node 1000. Control node 1000 can be an implementation of control elements of a content delivery network, such as portions of DNS translation nodes, management systems, control nodes, stenography nodes, anonymization nodes, or other elements, although variations are possible. For example, control node 1000 can be an example of stenography node 115 or DNS node 113 node in FIG. 1, control node 415 or DNS node 419 of FIG. 4, anonymization node 615 or routing node 616 of FIG. 6, or other elements of a CDN or DNS system discussed herein. Control node 1000 includes management interface 1010, communication interface 1020, and processing system 1030. Processing system 1030 includes processor 1040 and storage system 1050. In operation, processing system 1030 is operatively linked to management interface 1010, communication interface 1020, and storage system 1050. Processing system 1030 is capable of executing software 1060 stored in storage system 1050. When executing the software, processing system 1030 drives control node 1000 to operate as described herein. Control node 1000 can also include other elements, such as user interfaces, computer systems, databases, distributed storage and processing elements, and the like.

Management interface 1010 can comprise software interfaces, application programming interfaces (APIs), remote user interfaces, terminal interfaces, and the like. In some examples, management interface 1010 is implemented by processing system 1030 and communicates over network interface 1020. In other examples, management interface 1010 is configured to communicate over communication networks, such as packet networks, the Internet, and the like. Management interface 1010 can include one or more local or wide area network communication interfaces which can communicate over Ethernet or Internet protocol (IP) links. Management interface 1010 can include network interfaces configured to communicate using one or more network addresses, which can be associated with different network links. Examples of management interface 1010 include network interface card equipment, transceivers, modems, and other communication circuitry.

Network interface 1020 includes one or more network interfaces for communicating over communication networks, such as packet networks, the Internet, and the like. The network interfaces can include one or more local or wide area network communication interfaces which can communicate over Ethernet or Internet protocol (IP) links. Network interface 1020 can include network interfaces configured to communicate using one or more network addresses, which can be associated with different network links. Examples of network interface 1020 include network interface card equipment, transceivers, modems, and other communication circuitry.

Processing system 1030 can be implemented within a single processing device but can also be distributed across multiple processing devices or sub-systems that cooperate in executing program instructions. Examples of processing system 1030 include general purpose central processing units, microprocessors, application specific processors, and logic devices, as well as any other type of processing device. In some examples, processing system 1030 includes physically distributed processing devices, such as cloud computing systems.

Storage system 1050 comprises one or more computer-readable media-based data storage system, although variations are possible. Storage system 1050 can comprise any non-transitory storage media readable by processor 1040 and capable of storing at least software 1060. Storage system 1050 can include volatile and nonvolatile, removable and non-removable media implemented in any method or technology for storage of information, such as computer readable instructions, data structures, program modules, or other data. Storage system 1050 can include non-volatile storage media, such as solid state storage media, flash memory, or solid state storage system. Storage system 1050 can be implemented as a single storage device but can also be implemented across multiple storage devices or sub-systems. Storage system 1050 can comprise additional elements, such as controllers, capable of communicating with processor 1040.

Software stored on or in storage system 1050 can comprise computer program instructions, firmware, or some other form of machine-readable processing instructions having processes that when executed by processing system 1030 direct control node 1000 to operate as described herein. The software can also include user software applications. The software can be implemented as a single application or as multiple applications. In general, the software can, when loaded into processing system 1030 and executed, transform processing system 1030 from a general-purpose device into a special-purpose device customized as described herein.

In at least a first example, such as when control node 1000 is employed as stenography node 115 in FIG. 1, control node 415 in FIG. 4, or anonymization node 615 in FIG. 6, the machine-readable processing instructions comprise functional addressing logic 1070, which can include stenographic address generator 1071, anonymized address generator 1072, and correlation logic 1073. Stenographic address generator 1071 can generate network addresses which mark, encrypt, watermark, or otherwise encode information or functions within at least a portion of network addresses, such as lower-order bits of an IPv6 network address. Stenographic address generator 1071 can generate a plurality of addresses and provide these to DNS nodes, cache nodes, routing nodes, control nodes, or other network elements. Anonymized address generator 1072 can generate network addresses which are ephemeral or anonymized, such as using lower-order bits of an IPv6 network address. Anonymized address generator 1072 can generate a plurality of addresses and provide these to DNS nodes, routing nodes, control nodes, origin server nodes, or other network elements. Correlation logic 1073 can correlate endpoints with the stenographic addresses or anonymized addresses. For example, when anonymized addresses are employed to reach a cache node, then correlations between the cache nodes and the anonymized addresses can be established by correlation logic 1073. These correlations can be transferred to routing nodes for routing of anonymized traffic to proper cache nodes. When stenographic addresses are employed, then correlation logic 1073 can establish correlations between the stenographic addresses and encoded functions or encoded information. These correlations can be transferred to DNS nodes, cache nodes, routing nodes, control nodes, or other network elements.

In at least a second example, control node 1000 provides route selection features which can drive a DNS system to return a particular IP address responsive to DNS queries or DNS lookup requests from end user devices. For example, when control node 1000 is employed as DNS node 113 of FIG. 1, DNS node 419 of FIG. 4, or DNS node 619 of FIG. 6, domain name translation can be handled by control node 1000. In other examples, control node 1000 can be employed as routing node 616 in FIG. 6 and can perform route selection for anonymized addresses. The machine-readable processing instructions comprise routing logic 1080, which can include DNS translator 1081 and address router 1082. DNS translator 1081 translates domain names included in DNS queries or DNS translation requests into network addresses, which can include translation into stenographic addresses or anonymized addresses. DNS translator 1081 can maintain one or more lists of address translations, such as when rotating, ephemeral, or other address configurations are employed. When control node 1000 is employed in a DNS node, DNS translator 1081 can translate domain names into network addresses which include stenographic or anonymized portions and transfer the network addresses to endpoints. Furthermore, DNS translator 1081 can aid in localization or isolation of attack traffic when DNS requests are logged, dropped, or otherwise handled in accordance with attack mitigation actions. Address router 1082 can maintain one or more data structures which relates anonymized addresses to cache nodes, such as anonymized addresses used in content requests which are related to identifiers for cache nodes. Address router 1082 can receive these relationships from other control nodes. When employed as a routing node, such as routing node 616 of FIG. 6, Address router 1082 can be included to handle routing of content requests from end user devices as well as content deliveries from origin systems.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a content delivery network (CDN) comprising a plurality of cache nodes, each comprising a processor and stored instructions that cause the processor to cache content for delivery to end user devices, the method comprising:
    establishing address translations which translate domain names into network addresses usable by the end user devices for reaching content at the cache nodes, each network address comprising an upper portion configured to address one of the plurality of cache nodes, and a lower portion comprising stenographic information;
    responsive to domain name translation requests from the end user devices, providing ones of the network addresses;
    receiving content requests transferred by the end user devices that comprise the network addresses;
    performing, in one of the plurality of cache nodes, one or more actions based on the stenographic information in the network addresses.

2. The method of claim 1, wherein the network addresses comprise Internet Protocol version 6 (IPv6) network addresses, and wherein the lower portion is included in at least a lower 64 bits of the network addresses.

3. The method of claim 2, wherein the upper portion of the network addresses comprise at least an upper 64 bits of the network addresses.

4. The method of claim 1, wherein performing the one or more actions based on the stenographic information comprises processing the stenographic information included in the network addresses of the content requests to identify DNS nodes that serviced the domain name translation requests.

5. The method of claim 1, wherein performing the one or more actions based on the stenographic information comprises processing the stenographic information included in the network addresses of the content requests to identify geographic locations associated with the content requests.

6. The method of claim 1, further comprising:
    providing first ones of the network addresses to a first domain name system (DNS) node, the first ones of the network addresses comprising stenographic information selected to identify the first DNS node;
    providing second ones of the network addresses to a second DNS node, the second ones of the network addresses comprising stenographic information selected to identify the second DNS node; and
    wherein performing the one or more actions based on the stenographic information comprises processing the stenographic information included in the network addresses of the content requests to identify which among the first DNS node and the second DNS node serviced the domain name translation requests.

7. The method of claim 1, wherein the stenographic information comprises instructions for cache nodes which receive the content requests, and further comprising:
    in ones of the cache nodes that receive the content requests, identifying the instructions and responsively performing one or more actions commensurate with the instructions.

8. The method of claim 7, wherein the instructions indicate to drop traffic associated with the content requests that indicate the network addresses comprising the stenographic information.

9. The method of claim 7, wherein the instructions indicate to log traffic associated with the content requests that indicate the network addresses comprising the stenographic information.

10. A content delivery network (CDN) having a plurality of cache nodes, each comprising a processor and stored instructions that cause the processor to cache content for delivery to end user devices, the CDN comprising:
    a stenography node comprising a processor and stored instructions configured to cause the processor to establish address translations which translate domain names into network addresses usable by the end user devices to reach content at the cache nodes, each network address comprising an upper portion configured to address one of the plurality of cache nodes, and a lower portion comprising stenographic information;

the stenography node configured to provide the address translations to at least one domain name system (DNS) node that provides ones of the network addresses responsive to domain name translation requests from the end user devices;

at least one of the cache nodes configured to receive content requests transferred by the end user devices that comprise the network addresses, and perform one or more actions based on the stenographic information in the network addresses.

11. The CDN of claim 10, wherein the network addresses comprise Internet Protocol version 6 (IPv6) network addresses, and wherein the lower portion is included in at least a lower 64 bits of the network addresses.

12. The CDN of claim 11, wherein the upper portion of the network addresses comprise at least an upper 64 bits of the network addresses.

13. The CDN of claim 10, comprising:
the at least one of the cache nodes configured to process the stenographic information included in the network addresses of the content requests to identify DNS nodes that serviced the domain name translation requests.

14. The CDN of claim 10, comprising:
the at least one of the cache nodes configured to process the stenographic information included in the network addresses of the content requests to identify geographic locations associated with the content requests.

15. The CDN of claim 10, comprising:
the stenography node configured to provide first ones of the network addresses to a first domain name system (DNS) node, the first ones of the network addresses comprising stenographic information selected to identify the first DNS node;
the stenography node configured to provide second ones of the network addresses to a second DNS node, the second ones of the network addresses comprising stenographic information selected to identify the second DNS node; and
the at least one of the cache nodes configured to process the stenographic information included in the network addresses of the content requests to identify which among the first DNS node and the second DNS node serviced the domain name translation requests.

16. The CDN of claim 10, wherein the stenographic information comprises instructions for cache nodes which receive the content requests, and further comprising:
the at least one of the cache nodes configured to identify the instructions and responsively perform one or more actions commensurate with the instructions.

17. The CDN of claim 16, wherein the instructions indicate to drop traffic associated with the content requests that indicate the network addresses comprising the stenographic information.

18. The CDN of claim 16, wherein the instructions indicate to log traffic associated with the content requests that indicate the network addresses comprising the stenographic information.

19. A method of operating a stenography node of a content delivery network, the stenography node comprising a processor and stored instructions that cause the processor to cache content for delivery to end user devices, the method comprising:
establishing address translations which translate domain names into network addresses used for reaching content at selected cache nodes, each network address comprising an upper portion configured to address a cache node, and a lower portion comprising stenographic information used to distinguish among a plurality of domain name system (DNS) nodes which provide ones of the network addresses responsive to domain name translation requests from the end user devices;
instructing one or more cache nodes to perform one or more actions based on the stenographic information in the network addresses responsive to receiving content requests transferred by the end user devices that comprise the network addresses.

20. The method of claim 10, wherein the network addresses comprise Internet Protocol version 6 (IPv6) network addresses, wherein the lower portions of the network addresses comprising stenographic information are included in at least a lower 64 bits of the network addresses, and wherein the upper portions of the network addresses comprise at least an upper 64 bits of the network addresses.

* * * * *